United States Patent
Wood et al.

(10) Patent No.: US 7,082,606 B2
(45) Date of Patent: Jul. 25, 2006

(54) DEDICATED HETEROGENEOUS NODE SCHEDULING INCLUDING BACKFILL SCHEDULING

(75) Inventors: Robert R. Wood, Livermore, CA (US); Philip D. Eckert, Livermore, CA (US); Gregg Hommes, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 625 days.

(21) Appl. No.: 10/137,014

(22) Filed: Apr. 30, 2002

(65) Prior Publication Data
US 2002/0194248 A1    Dec. 19, 2002

Related U.S. Application Data

(60) Provisional application No. 60/288,255, filed on May 1, 2001.

(51) Int. Cl.
| | |
|---|---|
| G06F 9/46 | (2006.01) |
| G06F 15/167 | (2006.01) |
| G06F 15/173 | (2006.01) |
| G06F 15/16 | (2006.01) |
| G06F 19/00 | (2006.01) |
| G06F 11/00 | (2006.01) |
| G06F 12/00 | (2006.01) |

(52) U.S. Cl. ............... 718/102; 709/213; 709/223; 709/225; 709/232; 700/100; 714/47; 710/200

(58) Field of Classification Search ........ 718/100–108; 703/20; 714/47; 709/213–232; 710/200; 700/100
See application file for complete search history.

(56) References Cited

U.S. PATENT DOCUMENTS

| | | | | |
|---|---|---|---|---|
| 4,769,771 A | * | 9/1988 | Lippmann et al. | 709/213 |
| 5,093,794 A | * | 3/1992 | Howie et al. | 700/100 |
| 5,126,932 A | | 6/1992 | Wolfson et al. | |

(Continued)

OTHER PUBLICATIONS

Zhu et al., "Scheduling Optimization for Resource-Intensive Web Requests on Server Cluster", AMC, 1999, pp. 13-22.*

(Continued)

*Primary Examiner*—Meng-Al T. An
*Assistant Examiner*—Jennifer N. To
(74) *Attorney, Agent, or Firm*—James S. Tak; Alan H. Thompson

(57) ABSTRACT

A method and system for job backfill scheduling dedicated heterogeneous nodes in a multi-node computing environment. Heterogeneous nodes are grouped into homogeneous node sub-pools. For each sub-pool, a free node schedule (FNS) is created so that the number of to chart the free nodes over time. For each prioritized job, using the FNS of sub-pools having nodes useable by a particular job, to determine the earliest time range (ETR) capable of running the job. Once determined for a particular job, scheduling the job to run in that ETR. If the ETR determined for a lower priority job (LPJ) has a start time earlier than a higher priority job (HPJ), then the LPJ is scheduled in that ETR if it would not disturb the anticipated start times of any HPJ previously scheduled for a future time. Thus, efficient utilization and throughput of such computing environments may be increased by utilizing resources otherwise remaining idle.

20 Claims, 13 Drawing Sheets

U.S. PATENT DOCUMENTS

| | | | | |
|---|---|---|---|---|
| 5,349,682 | A | * | 9/1994 | Rosenberry ................. 718/102 |
| 5,392,430 | A | | 2/1995 | Chen et al. |
| 5,797,000 | A | | 8/1998 | Bhattacharya et al. |
| 5,978,829 | A | * | 11/1999 | Chung et al. ............... 718/102 |
| 6,076,174 | A | * | 6/2000 | Freund ........................ 714/47 |
| 6,117,180 | A | * | 9/2000 | Dave et al. ................... 703/20 |
| 6,317,774 | B1 | | 11/2001 | Jones et al. |
| 6,345,287 | B1 | * | 2/2002 | Fong et al. ................. 718/102 |
| 6,460,082 | B1 | * | 10/2002 | Lumelsky et al. .......... 709/226 |
| 6,470,406 | B1 | * | 10/2002 | Dillenberger et al. ....... 710/200 |
| 6,516,348 | B1 | * | 2/2003 | MacFarlane et al. ........ 709/224 |
| 2002/0083185 | A1 | * | 6/2002 | Ruttenberg et al. ......... 709/232 |
| 2003/0097443 | A1 | * | 5/2003 | Gillett et al. ............... 709/225 |
| 2003/0217134 | A1 | * | 11/2003 | Fontoura et al. ............ 709/223 |

OTHER PUBLICATIONS

Agnihotri et al., "The Penn State Computing Condominium Scheduling System", IEEE 1998, pp. 1-4.*

Su-Hui Chiang et al, Production Job Scheduling for Parallel Shared Memory Systems, Proc. International Parallel and Distributed Processing Symp. 2001 San Francisco, Apr. 2001.

Dejan Perkovic et al, Randomization, Speculation, and Adaptation in Batch Schedulers, Department of Computer Science University of Maryland.

Ahuva W. Mualem et al, Utilization, Predictability, Workloads, and User Runtime Estimates in Scheduling the IBM SP2 with Backfilling, IEEE Transactions on Parallel and Distributed Systems vol. 12, No. 6, Jun. 2001.

* cited by examiner

DEDICATED HETEROGENEOUS NODE SCHEDULING INCLUDING BACKFILL SCHEDULING

CLAIM OF PRIORITY IN PROVISIONAL APPLICATION

This application claims priority in provisional application filed on May 1, 2001, entitled "Dedicated Heterogeneous Node Backfill Scheduling" serial No. 60/288,255, by inventor(s) Robert R. Wood, Philip D. Eckert, and Gregg Hommes.

The United States Government has rights in this invention pursuant to Contract No. W-7405-ENG-46 between the United States Department of Energy and the University of California for the operation of Lawrence Livermore National Laboratory.

FIELD OF THE INVENTION

The present invention relates to job scheduling in dedicated multi-node computer systems and networks. More particularly, the present invention relates to job scheduling and backfill scheduling in dedicated heterogeneous multi-node computing environments where nodes of varying capacities may be efficiently and optimally utilized without degrading utilization or throughput of higher priority jobs.

BACKGROUND OF THE INVENTION

Scheduling jobs on parallel computer systems is challenging due to high job submission rates, high utilization of system processors and memory, i.e. scarcity of free resources at any given time, and unpredictable arrival of jobs having various system resource requirements. In an effort to efficiently schedule jobs and optimize utilization of system resources, various job scheduling methods and systems have been developed employing backfill scheduling algorithms. "Backfill scheduling" (or backfill job scheduling) enables lower priority jobs to move forward in the schedule ahead of higher priority jobs as long as such movement does not cause any higher priority scheduled job to be delayed. In one particular backfill scheduler employing known as the "EASY backfilling algorithm," jobs may be moved ahead in the schedule as long as such movement does not delay the first queued job.

Backfill scheduling technology, however, is essentially limited to scheduling dedicated homogenous nodes of a multi-node computer system or network, i.e. where all the nodes have identical capacities. This limitation effectively prevents current backfill scheduling technology from recognizing or distinguishing the capacities (e.g., CPUs per node and memory) of nodes in the scheduling set, or the differing resource requirements of jobs to be scheduled. Consequently, current backfill scheduling technology does not work properly when the node set contains nodes not all having identical or equal capacities, i.e. heterogeneous nodes. When used in a heterogeneous environment, these deficiencies may frequently result in: (1) erroneous priority scheduling when the resources required by the priority job are not available causing it to not start at the intended schedule time, (2) erroneous backfill scheduling when the resources required by the backfill job are not available causing it to not start at the intended schedule time and consequently causing the delayed start of higher priority jobs, or (3) erroneously not backfill scheduling as a result of computing the start time of a higher priority job to be sooner than it could really start.

This problem has heretofore been addressed by avoiding heterogeneous node environments altogether (running jobs on only homogenous node systems), or by separating heterogeneous nodes into homogeneous pools and requiring users to place their jobs into the correct pool for the job. While both methods permit user jobs to run, they do not fully utilize all of a system resources in an efficient manner.

SUMMARY OF THE INVENTION

One aspect of the invention includes a method for job scheduling in a dedicated heterogeneous multi-node computing environment, the method comprising: grouping the nodes into homogeneous node sub-pools each comprising nodes of equal capacity; for each sub-pool, creating a corresponding free node schedule which charts the number of free nodes in the sub-pool over time; receiving a plurality of jobs to be scheduled; ordering the jobs by job priority; for each job in order of job priority, (a) identifying a conforming sub-pool set comprising conforming nodes of sufficient capacity suitable for use by the job, (b) determining an earliest available time range from the free node schedule(s) of the conforming sub-pool set, where the earliest available time range has a sufficient duration and a sufficient number of conforming free nodes to complete the job, and (c) scheduling the job for execution in the earliest available time range; and executing the jobs at their respective earliest available time ranges.

Another aspect of the invention includes a method for job scheduling in a dedicated heterogeneous multi-node computing environment, the method comprising: grouping the nodes into homogeneous node sub-pools each comprising nodes of equal capacity; for each sub-pool, creating a corresponding free node schedule which charts the number of free nodes in the sub-pool over time; receiving a plurality of jobs to be scheduled; ordering the jobs by job priority; for each job in order of job priority, (a) identifying a conforming sub-pool set comprising conforming nodes of sufficient capacity suitable for use by the job, (b) determining an earliest available time range from the free node schedule(s) of the conforming sub-pool set, where the earliest available time range has a sufficient duration and a sufficient number of conforming free nodes to complete the job, and (c) scheduling the job for execution in the earliest available time range, including, (1) upon a determination that the earliest available time range of the job starts at the present time, presently scheduling the job for immediate execution by allocating as many conforming free nodes to the job as required thereby in order of increasing node capacity starting with the conforming free nodes of a lowest order conforming sub-pool, (2) upon a determination that the earliest available time range of the job starts at a future time, pseudo-scheduling the job for future execution by marking for dedication to the job as many conforming free nodes in the earliest available time range as required by the job, in order of increasing node capacity starting with the conforming free nodes of a lowest order conforming sub-pool, and (3) upon a determination that a start time of an earliest available time range of a lower priority job to be scheduled occurs prior to a future start time of an earliest available time range of at least one of a set of higher priority jobs previously pseudo-scheduled for future execution, backfill scheduling the lower priority job for execution starting ahead of the future start time of the at least one of the set of higher priority jobs, whereby anticipated future start times of the previously pseudo-scheduled set of higher priority jobs are not delayed by the backfill scheduling; and executing the jobs at their respective earliest available time ranges.

And another aspect of the invention includes a computer system for job scheduling in a dedicated heterogeneous node computer environment, the computer system comprising: a data mining component that discovers the nodes and node capacities in the scheduling environment; a node grouping component that groups the discovered nodes into homogeneous node sub-pools each comprising nodes of equal capacity; a free node schedule forming component that creates for each sub-pool a corresponding free node schedule which charts the number of free nodes in the corresponding sub-pool over time; a user interface for receiving a plurality of jobs to be scheduled; an ordering component for ordering the jobs by job priority; a job analyzing component that, for each job in order of job priority, (a) identifies a conforming sub-pool set comprising conforming nodes of sufficient capacity suitable for use by the job, and (b) determines an earliest available time range from the free node schedule(s) of the conforming sub-pool set, where the earliest available time range has a sufficient duration and a sufficient number of conforming free nodes to complete the job; and a job scheduling component for scheduling each job for execution in the respective earliest available time range.

Still another aspect of the invention includes a computer-readable medium containing instructions for controlling a computer system to schedule jobs in a dedicated heterogeneous multi-node computing environment, by: grouping the nodes into homogeneous node sub-pools each comprising nodes of equal capacity; for each sub-pool, creating a corresponding free node schedule which charts the number of free nodes in the sub-pool over time; receiving a plurality of jobs to be scheduled; ordering the jobs by job priority; for each job in order of job priority, (a) identifying a conforming sub-pool set comprising conforming nodes of sufficient capacity suitable for use by the job, (b) determining an earliest available time range from the free node schedule(s) of the conforming sub-pool set, where the earliest available time range has a sufficient duration and a sufficient number of conforming free nodes to complete the job, and (c) scheduling the job for execution in the earliest available time range; and executing the jobs at their respective earliest available time ranges.

And still another aspect of the invention includes a computer-readable medium containing instructions for controlling a computer system to schedule jobs in a dedicated heterogeneous multi-node computing environment, by: grouping the nodes into homogeneous node sub-pools each comprising nodes of equal capacity; for each sub-pool, creating a corresponding free node schedule which charts the number of free nodes in the sub-pool over time; receiving a plurality of jobs to be scheduled; ordering the jobs by job priority; for each job in order of job priority, (a) identifying a conforming sub-pool set comprising conforming nodes of sufficient capacity suitable for use by the job, (b) determining an earliest available time range from the free node schedule(s) of the conforming sub-pool set, where the earliest available time range has a sufficient duration and a sufficient number of conforming free nodes to complete the job, and (c) scheduling the job for execution in the earliest available time range, including, (1) upon a determination that the earliest available time range of the job starts at the present time, presently scheduling the job for immediate execution by allocating as many conforming free nodes to the job as required thereby in order of increasing node capacity starting with the conforming free nodes of a lowest order conforming sub-pool, (2) upon a determination that the earliest available time range of the job starts at a future time, pseudo-scheduling the job for future execution by marking for dedication to the job as many conforming free nodes in the earliest available time range as required by the job, in order of increasing node capacity starting with the conforming free nodes of a lowest order conforming sub-pool, and (3) upon a determination that a start time of an earliest available time range of a lower priority job to be scheduled occurs prior to a future start time of an earliest available time range of at least one of a set of higher priority jobs previously pseudo-scheduled for future execution, backfill scheduling the lower priority job for execution starting ahead of the future start time of the at least one of the set of higher priority jobs, whereby anticipated future start times of the previously pseudo-scheduled set of higher priority jobs are not delayed by the backfill scheduling; and executing the jobs at their respective earliest available time ranges.

One advantage of the method and system of the present invention is that a job scheduler can backfill schedule dedicated heterogeneous multi-node computers without causing any delay in the execution of higher priority jobs, regardless of the resources required by the higher priority jobs. In this manner, the overall efficient utilization and throughput of dedicated heterogeneous multi-node computers may be increased without degrading utilization or throughput of higher priority jobs by utilizing resources that would otherwise remain idle.

BRIEF DESCRIPTION OF THE DRAWINGS

The accompanying drawings, which are incorporated into and form a part of the disclosure, are as follows.

DETAILED DESCRIPTION

Turning now to the drawings, FIGS. 1–14 show a flow diagram of a preferred algorithm and embodiment of the method for job scheduling and backfill scheduling dedicated heterogeneous multi-node computing environments of the present invention. Generally, the present invention operates to: (a) presently schedule a job for immediate execution if there are sufficient resources available in the computing environment to schedule the job which is the highest priority job awaiting scheduling, or (b) if a job cannot be scheduled immediately, then schedule the job in priority order to run at the earliest available time range such that scheduling the job will not delay the anticipated start of any higher priority job, or (c) if result (b) is not possible, not schedule a job. Result (b) in particular provides for backfill scheduling of a lower priority job ahead of an exemplary higher priority job scheduled for future execution if the backfill scheduling of the lower priority job ahead of the exemplary higher priority job would not delay the anticipated start time of any higher priority job already pseudo-scheduled. In this manner, the present method of job scheduling and backfill scheduling serves to efficiently schedule jobs having different minimum job requirements, and to optimize utilization of limited system resources by addressing and differentially treating the different capacities of dedicated heterogeneous nodes.

It is appreciated that a "node" is a computer in a scheduled computational environment. For example, the computers that comprise an IBM SP2 are nodes. And a "job" is a set of related processes, a subset of which may run on a node. A job may run on more than one node at a time. When the job runs, the number of nodes it requires are allocated to the job which are then available for the job's usage. It is also appreciated that the method of job scheduling of the present invention is premised on "dedicated node scheduling" which is a scheduling regime where either zero or one job is running at each node in the environment at any one time. And as mentioned in the background, a "heterogeneous node environment" is one in which the nodes in the environment do not all have identical or equal capacities, compared to homogeneous node environments which do.

It is also notable that the method of the present invention requires that there exist an enforced node allocation order. This order must be a sufficient ordering of the nodes by capacity. In particular, all the nodes of a sub-pool must have the same order. Of course, only nodes with sufficient capacity for the requirements of a job can be allocated to the job. However, of the nodes with sufficient capacity for the job, those with a lesser capacity rating must be allocated to jobs before those with a higher capacity rating. That is, if node m is allocated to a job and node n could be but isn't, then $O(m)$ must be $\leq O(n)$ where O is the ordering rule.

Figure 1:
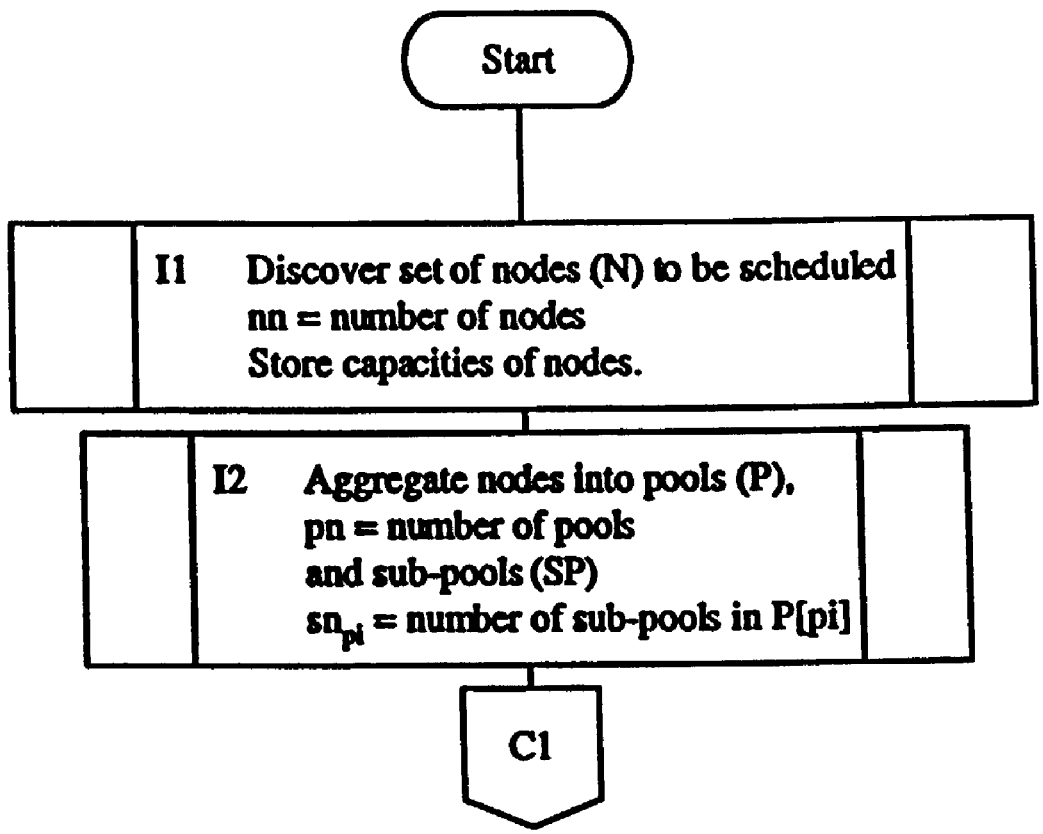
FIG. 1 is a flow diagram of a preferred embodiment of the present invention, and particularly illustrating steps for initializing pools and sub-pools.

FIG. 1 shows the start of the preferred algorithm of the present invention by initializing pools and sub-pools at blocks I1 and I2. At block I1, a set of nodes N to be scheduled is first discovered, including the capacities of the nodes. The discovery process may be performed by various methods, such as by system calls from kernels which retrieve processor speed, memory, and/or other node capacity information. Additionally, data mining tools may be employed for node and node capacity discovery. As used herein and in the drawings, "N" is defined as the set of nodes in the scheduling environment, "nn" is the number of nodes in N, and N[ni] is the $ni^{th}$ node of N where $0 \leq ni < nn$. For each node, the node capacities that are potentially different from other nodes are discovered and stored. It is appreciated that a "node capacity" is a resource resident on a node. This resource must be accessible to and specifiable as a requirement by jobs that may be scheduled in the computational environment. Some capacities have scalar values attached to them that indicate "how much" of the capacity a node has while others indicate if a feature is present or absent without an associated quantity. Examples of capacities are the number of CPUs in the node, the speed of the CPUs and the amount of memory. Also, for example, the IBM SP2 allows administrators to enable nodes with "classes" that may be requested by jobs. Another example is that administrators may constrain applications to run on certain nodes but not others. In any case, the capacities of each node can be optionally designated as a required resource for jobs (see greater discussion below). Once the initial discovery of the nodes and node capacities has been completed, it is typically unnecessary to repeatedly rediscover the nodes and node capacities, unless of course changes were made in the number and capacities of the nodes.

Next, at block I2, nodes are grouped or aggregated into pools P, where P is the set of node pools in the scheduling environment, pn is the number of pools, and P[pi] is the $pi^{th}$ pool of P where $0 \leq pi < pn$. As used herein and in the claims, a "node pool" is a set of nodes, where each node is in exactly one pool so that the set of node pools in an environment partitions the environment. Within each node pool, nodes of identical capacity are grouped or aggregated into sub-pools, SP, defined as a set of nodes in a pool with identical capacity. If the system does not support the notion of pools, then all nodes will reside in one pool (pn==1). In such a case, the algorithm can disregard iterations provided to account for multiple pools, and consider only the multiplicity of sub-pools. The data for each sub-pool will contain all measures of its capacities, such as the number of nodes in the sub-pool and the number of usable, available or "online" nodes in the sub-pool. In addition, each sub-pool has associated with it a free node schedule which specifies the number of free nodes in the sub-pool over time (discussion below). The sub-pools in a pool must be sorted in the same order as the allocation order of nodes on the machine. In the figures, SP is a set of sub-pools, SP[pi] is the set of sub-pools of P[pi], $sn_{pi}$ is the number of sub-pools of P[pi], and SP[pi][si] is the $si^{th}$ sub-pool of P[pi] where $0 \leq si < sn_{pi}$.

Figure 2:
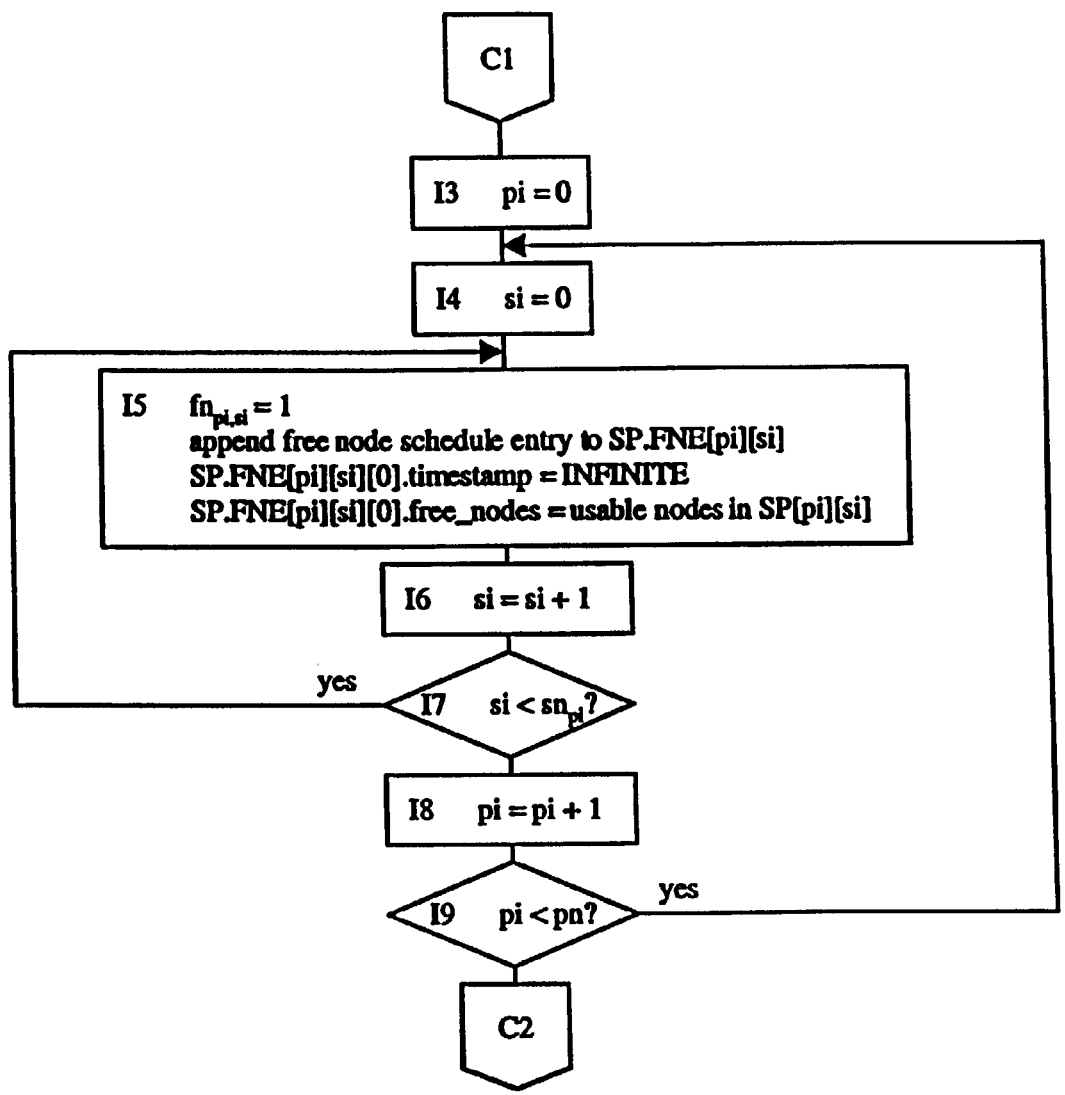
FIG. 2 is a flow diagram continued from FIG. 1 at block C1, and particularly illustrating steps for initializing free node schedules for each sub-pool.

FIG. 2 shows a routine continued from FIG. 1 at block C1 and comprising steps I3–I9 for creating and initializing "free node schedules" for every discovered sub-pool. A "free node" is an available, usable node with no jobs running on it. And a "free node schedule" is used to chart the number of free nodes in a corresponding sub-pool over time. A free node schedule is a sub-pool attribute defined as a list of free node descriptor entries (hereinafter "entries") comprising a pair of values, and sorted in logical timestamp order. The first value of an entry is the number of free nodes in a sub-pool, e.g. 0, 1 or more. And the second value is either a timestamp that gives the time until which the specified number of nodes will remain free or a change in time (duration) from a previous entry depending on the context in which the descriptor is being used. In a preferred step of the present algorithm, the timestamp is converted to represent the amount of time during which the specified nodes will be free (see discussion below). In any case, the first entry of a free node schedule initially describes the number of free nodes up until the specified timestamp value. And all following entries describe the number of free nodes from the timestamp of the previous entry up until its own specified timestamp value. And the last entry describes the number of free nodes that will remain after the last job with a known termination time terminates. In other words, the last entry will have as its number of free nodes the total number of nodes in a given sub-pool.

In particular, FIG. 2 starts by creating a free node schedule at block I5 associated with a first sub-pool from a first sub-pool (si=0 at block I4) of a first pool (pi=0 at block I3). The first sub-pool has a single entry or free node descriptor, which is the initialization entry. The initialization entry has a timestamp value set to INFINITE, and free nodes value set to the total number of usable nodes in the sub-pool. INFINITE is defined as an impossible timestamp or change in time used to indicate that the timestamp or change in time of a free node schedule is unending or unknown. This indicates that (as far as is known so far) the number of free nodes is equal to the number of nodes in the sub-pool and that they will be free forever. In the figures, SP.FNE represents a free node schedule; SP.FNE[pi][si] is the free node schedule of SP[pi][si]; $fn_{pi,si}$ is the number of free node schedule entries in SP.FNE[pi][si]; and SP.FNE[pi][si][fi] is the $fi^{th}$ free node schedule entry of SP[pi][si] where $0 \leq fi < fn_{pi,si}$. Similarly, free node schedules are created at blocks I6 and I7 for every sub-pool, and containing a single initialization entry.

Figure 3:
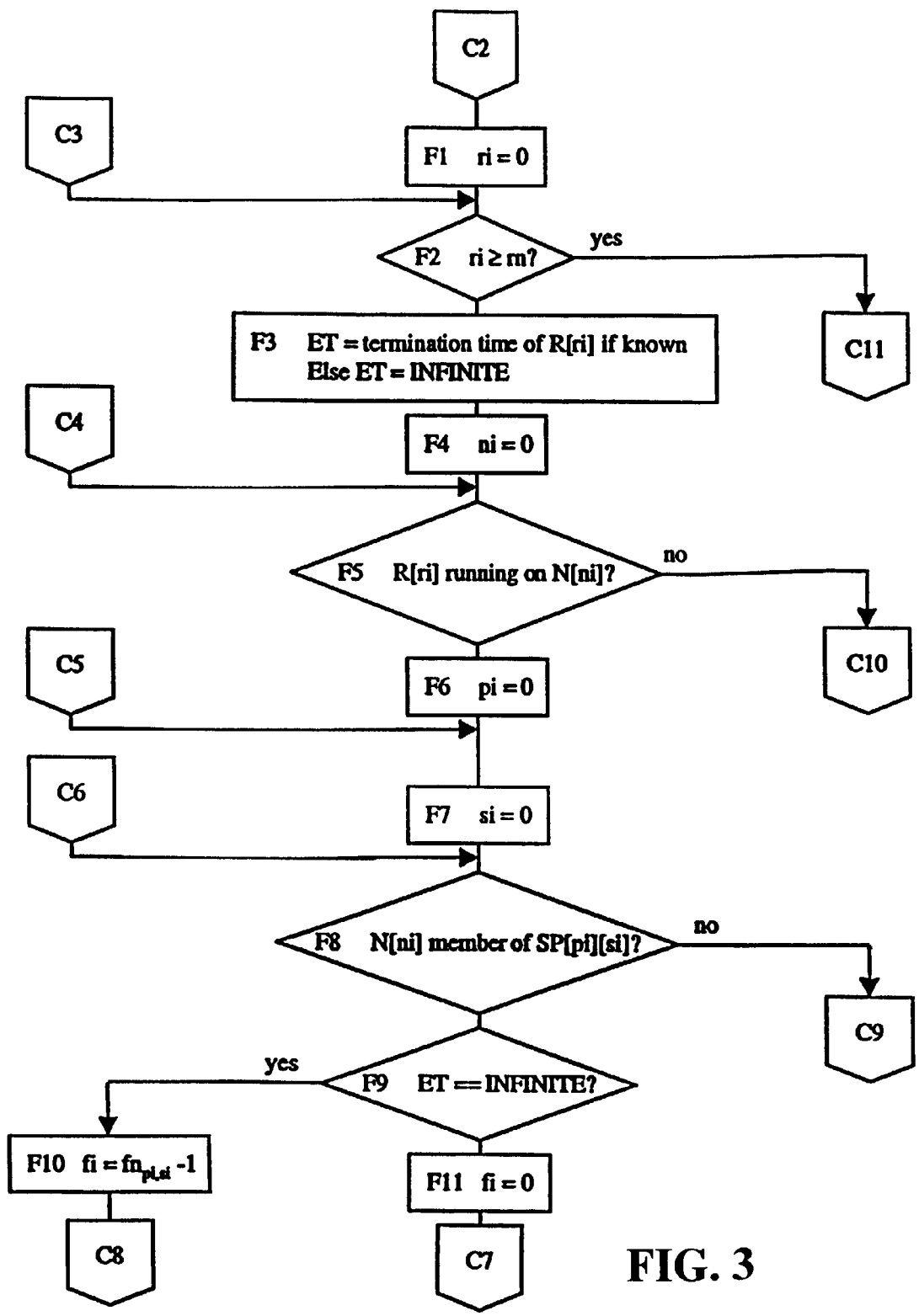
FIG. 3 is a flow diagram continued from FIG. 2 at block C2, and particularly illustrating steps for building free node schedules for each sub-pool.
Figure 4:
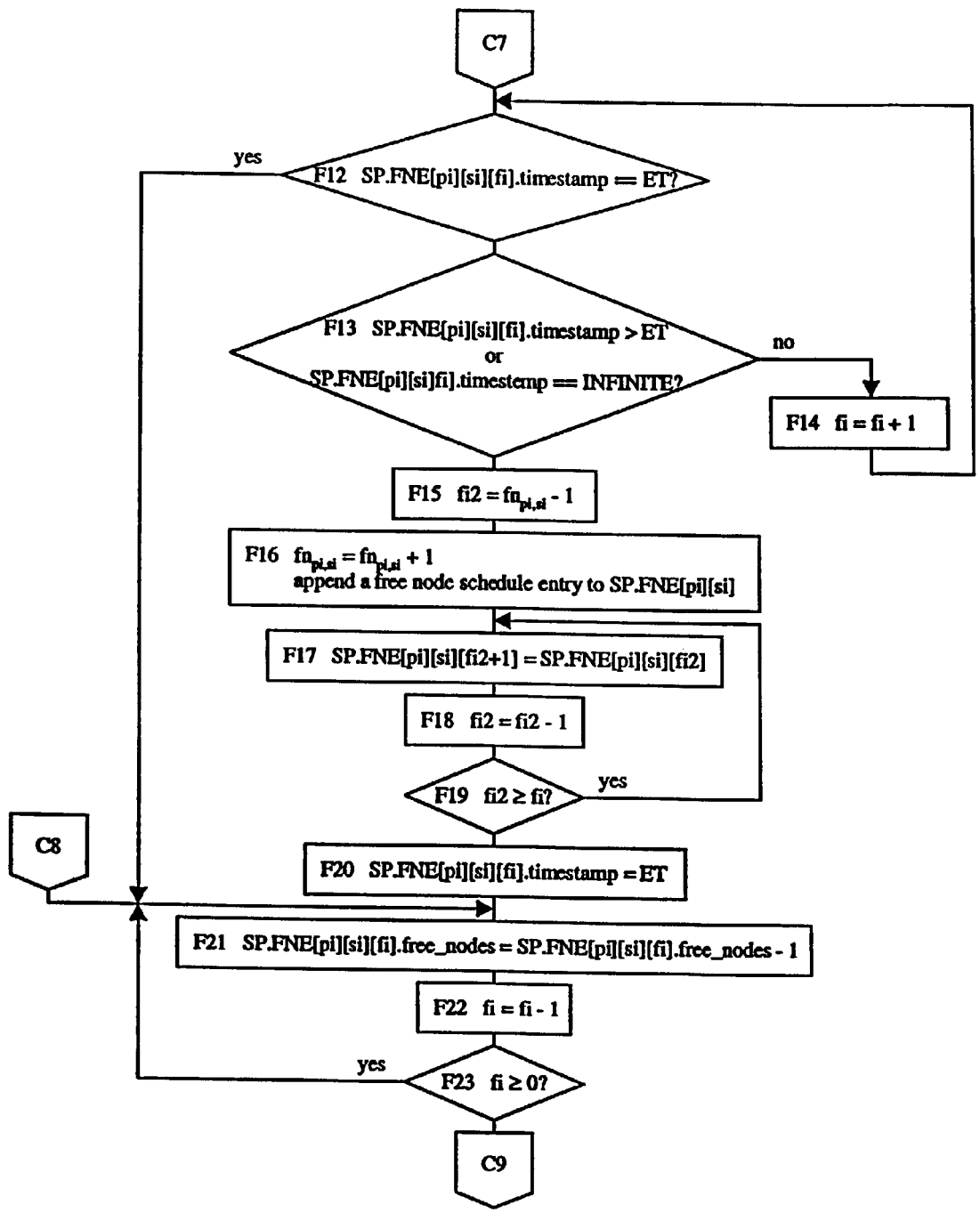
FIG. 4 is a flow diagram continued from FIG. 3 at block C7, and particularly illustrating continuation steps for building free node schedules for each sub-pool.
Figure 5:
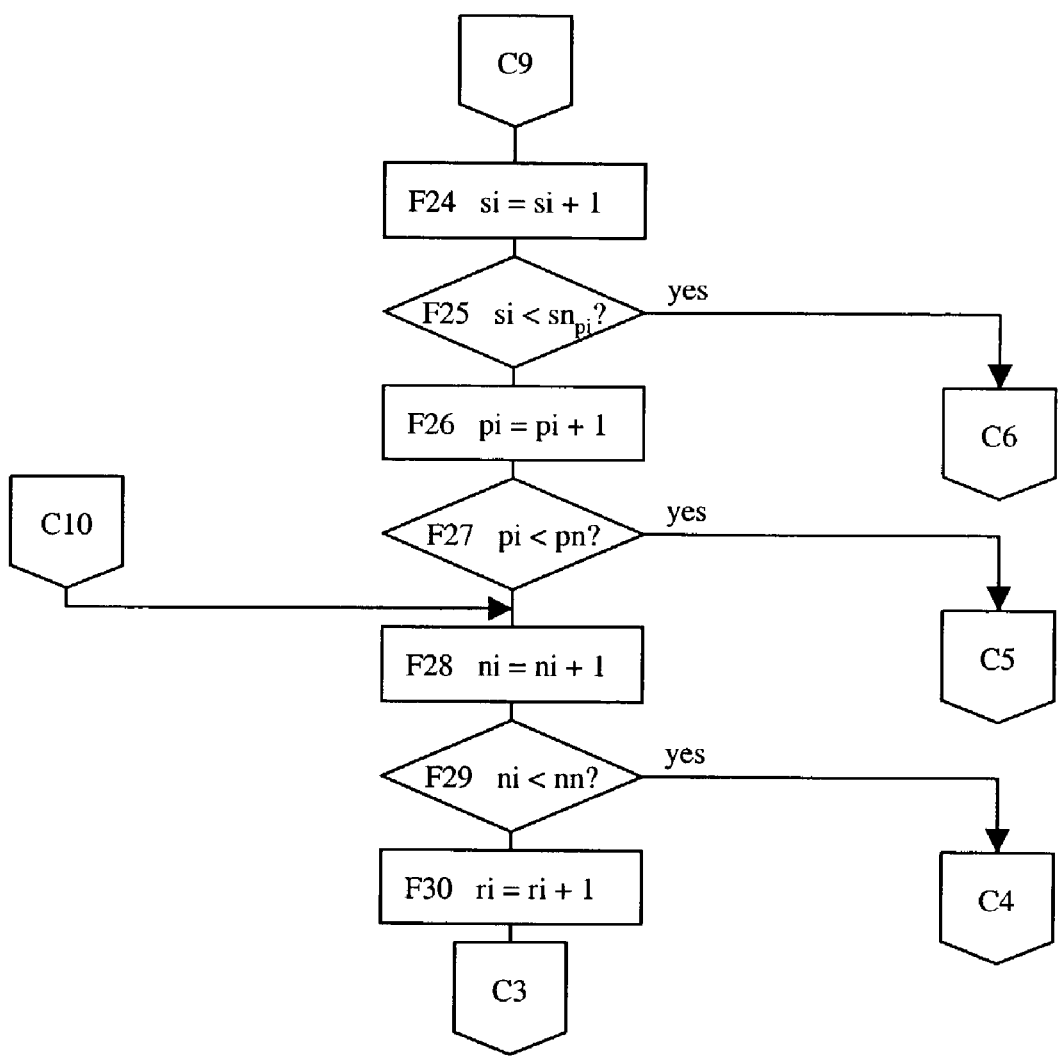
FIG. 5 is a flow diagram continued from FIG. 4 at block C9, and particularly illustrating continuation steps for building free node schedules for each sub-pool.

In FIGS. 3–5, each free node schedule is further constructed to completely describe node availability in a given sub-pool over time. Continuing from block C2 of FIG. 2, blocks F1–F30 of FIG. 3–5 are shown illustrating a preferred free node schedule construction process. In the figures, R is the set of running jobs in the environment; rn is the number of running jobs in R, and R[ri] is the $ri^{th}$ running job in R where $0 \leq ri < rn$. Additionally, "ET," is defined as the expected termination time of a particular running job R[ri], which is set to equal the value of the expected termination time of R[ri]. At blocks F1 to F11 of FIG. 3, every currently running job is examined to determine which node of which sub-pool of which pool is running the job.

In FIG. 4, blocks F12 through F23 reduce the free nodes which are available in each sub-pool over time by the number of nodes currently in use by a given running job. In particular, steps F12, F13 and F14 search the existing free node schedule entries, comparing the timestamp of the entry with the expected termination time of the job being worked with. At step F12, if an entry index (fi) is found with a timestamp equal to the expected termination time of the job, the process jumps to step F21. But if no such entry can be found, then new additional entries in the sub-pools must be created. When the determination is made that there is no entry in the schedule with the same timestamp as the expected termination time of the job, the entry index, fi, points to the first entry in the schedule with a timestamp logically greater than the expected termination time of the job. The process of inserting a new free node schedule entry begins with step F15 at which a secondary index fi2 is set to the index of the (current) last entry in the schedule. Step F16 increments by one the number of entries in the schedule.

Steps F17, F18 and F19 iterate to set the values of an entry to the values of its immediately preceding entry.

When the subroutine that builds the free node schedule is complete, every entry between the entry index, fi, and the last entry in the schedule will have been moved "down" one in the list to make room for a new entry with the same timestamp as the expected termination time of the job being worked with. Steps F21, F22 and F23 decrement by one the number of free nodes in every free node schedule entry with an index between 0 and the input index. Furthermore, there will be one or more entries in each free node schedule for each sub-pool in each pool. The last entry in each schedule lists the number of nodes that are expected to be free after all jobs with a known termination time that use nodes in the sub-pool have terminated (and is the single entry with the INFINITE timestamp). All other entries contain the number of nodes that will be free until the time indicated by its timestamp. The timestamp in each entry except the last corresponds to the expected termination time of at least one job. And the steps shown in FIG. 5 repeat the iterations described above for building the free node schedules in steps F24–F30, accounting for every node of every sub-pool of every pool, as well as every currently running job R[ri].

Figure 6:
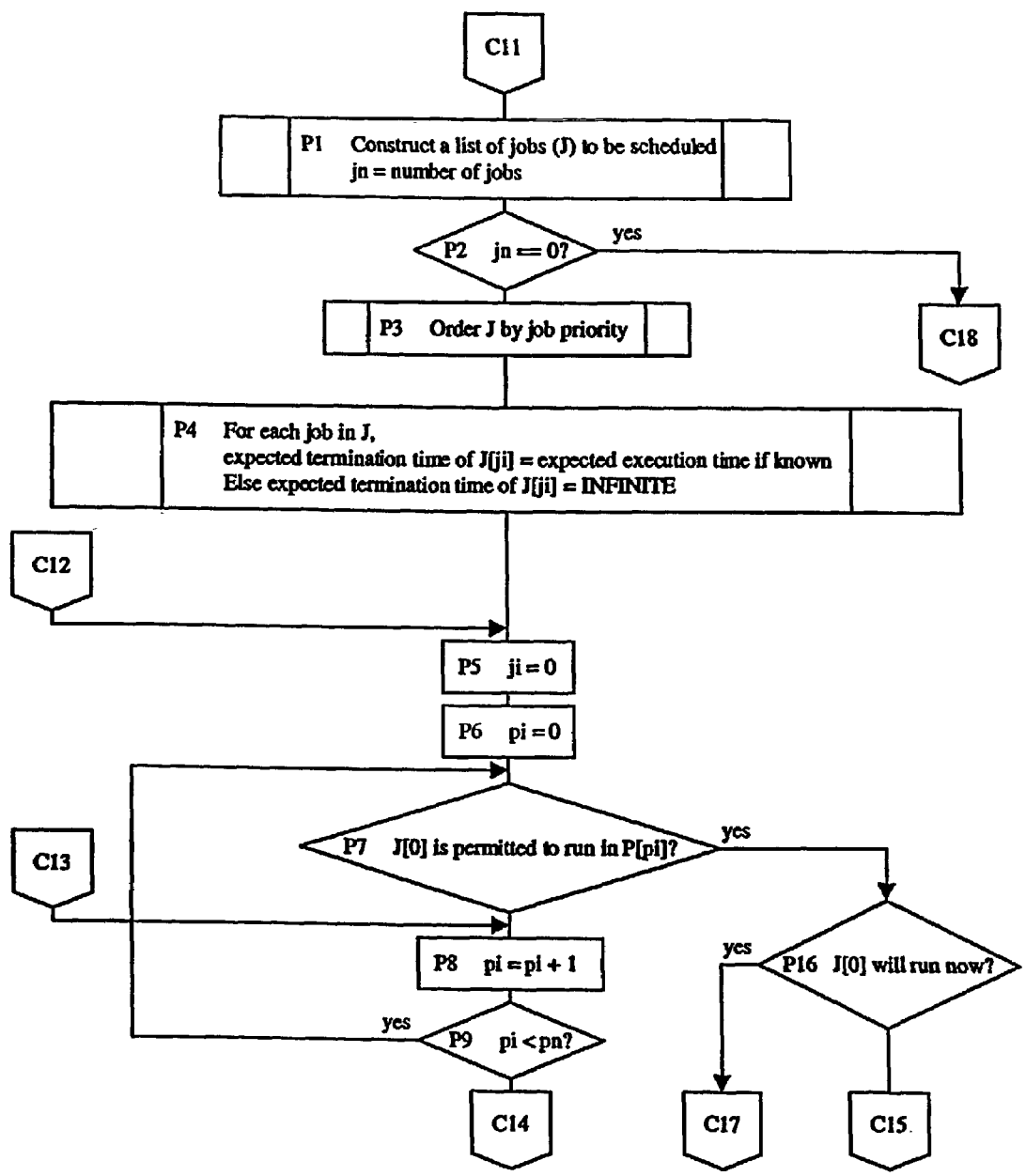
FIG. 6 is a flow diagram continued from FIG. 3 at block C11, and particularly illustrating steps for priority scheduling jobs.

Upon building all the free node schedules of each sub-pool, a list of jobs J is created at FIG. 6 for priority scheduling, indicated by blocks P1–P16. J is the set of jobs to be scheduled in the environment. Furthermore, jn is the number of jobs in J, and J[ji] is the $ji^{th}$ job in J where $0 \leq ji < jn$. For each job submitted, the determination of minimum job requirements may be provided by the user and known upon receipt of job submission, or determined by the scheduler/ algorithm subsequent to job receipt. In the latter case, default values for the minimum job requirements may be assigned. In any case, block P2 determines if there are any jobs to be scheduled. If there are no more jobs, then the system waits for a scheduling event to occur at block W1 in FIG. 10 via block C18.

Figure 7:
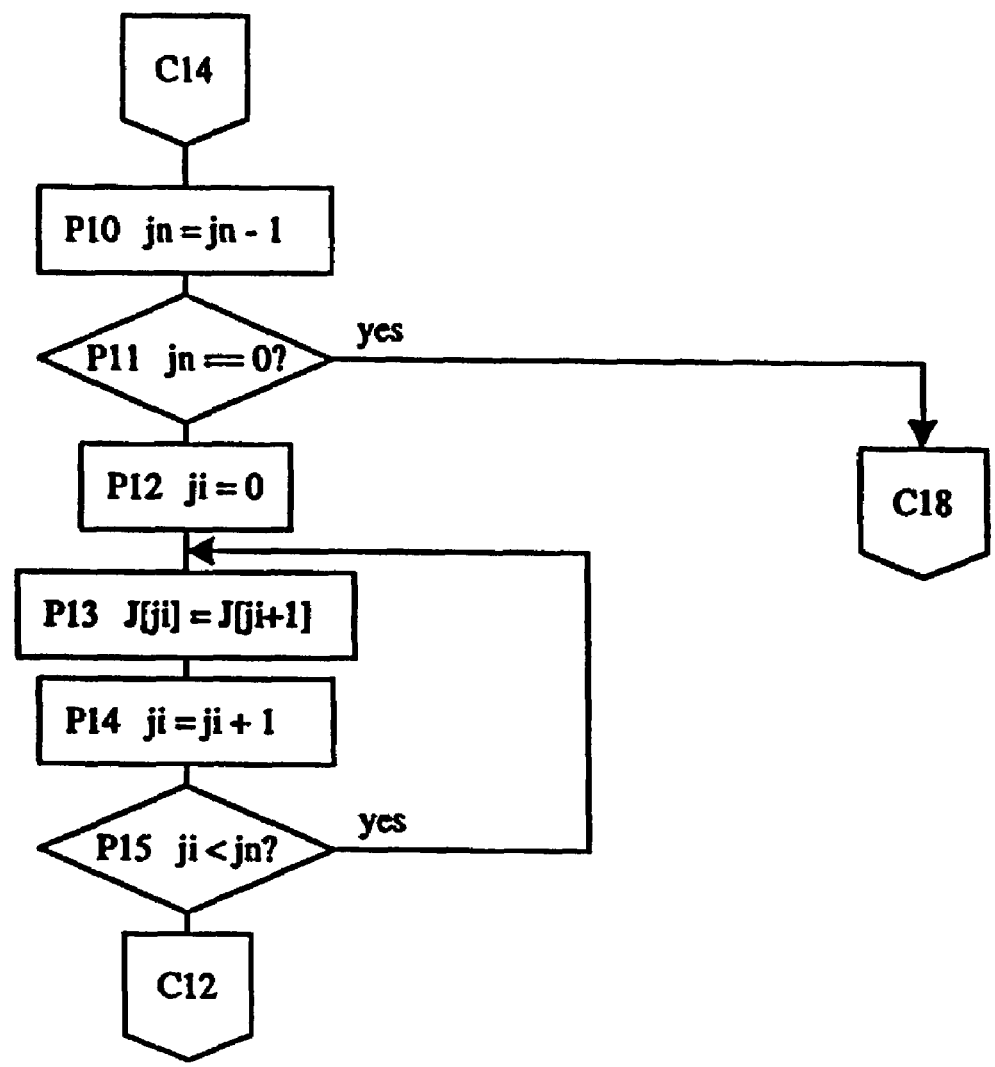
FIG. 7 is a flow diagram continued from FIG. 6, and particularly illustrating steps for removing jobs from the list which are incapable of running in any of the pools.

Otherwise, at step P3, the jobs to be scheduled are ordered by job priority with the highest priority job first. The term "job priority" is defined as a ranking of jobs governed by any algorithm or rule that assigns a scalar value to each job to be scheduled, e.g., timestamp of job submittal time is a suitable ranking of jobs. For each job in J, the expected termination time of every job in J for which the expected execution time is unknown is set to INFINITE, and the expected termination time of every job whose expected execution time is known is set to the expected execution time. Starting with the job of highest priority, a determination is made at block P7 whether the highest priority job J[0] is permitted to run in P[pi]. If J[0] is not permitted to run, then the index pi is increased to consider another pool in the set of pools P and returns to step P7. If none of the pools in P is permitted to run job J[0], then J[0] is removed from the job list at block C14. FIG. 7 shows a job removal subroutine where a job continued from block C14 which cannot be run on any of the pools and is therefore removed from the job list. This is shown in FIG. 7 by blocks P10–P15. Once a job is removed, the process returns to block C12 in FIG. 6 and repeated to again determine, with a newly defined first job J[0], if the next highest priority job is permitted to run in P[pi] at block P16.

If J[0] is permitted to run in P[pi], the process goes to step P16 where a determination is made whether J[0] will run now, and thus follow either block C15 or C17. It is notable here that the term "job scheduling" is defined broadly to cover both situations of (1) presently scheduling for immediate execution, and pseudo-scheduling for execution at a future time. Pseudo-scheduling is a type of job scheduling wherein a job is scheduled to be executed at a future time by marking for dedication to the job as many conforming free nodes in the earliest available time range as required by the job, in order of increasing node capacity starting with the conforming free nodes of a lowest order conforming sub-pool. It is appreciated that "pseudo-scheduling" a job is the process of accounting for the node usage in all sub-pools that would be affected if the job was actually scheduled. However, pseudo-scheduling does not actually cause a job to run. This is differentiated from present scheduling, where nodes are allocated and committed to a job so that the job may be run now. It is notable that, as used herein and in the claims, the terms "conforming nodes" and "conforming free nodes" are those nodes of sufficient capacity suitable for use by a job. Similarly, "conforming set of sub-pools" (hereinafter "conforming sub-pool set") is defined as comprising all sub-pools to which all conforming nodes belong. For each job received, a conforming sub-pool set is identified such that the job analysis of the present invention is limited to only those conforming sub-pools having the minimum node capacities required by a job.

Upon a determination at step P16 that a job can be run immediately if scheduled, the flow chart returns to block R1 via block C17, where the job is then presently scheduled for immediate execution. A job will run if scheduled if the sum of free nodes in SP.FNE[pi][si][0] for every si (where $0 \leq si < sn_{pi}$ and the nodes of SP[pi][si] have sufficient capacity to run the job)$\geq$the number of nodes required by the job. In other words, present scheduling for immediate job execution proceeds to allocate as many nodes from the conforming set of sub-pools.

Upon a determination at step P16 that there is not sufficient resources to run a job now, the job is "pseudo-scheduled" in priority order for execution at a future time. In preparation for pseudo-scheduling, the method "normalizes" the free node schedule of every SP[pi][si] (where $0 \leq si < sn_{pi}$) such that every schedule has the same number of entries with identical timestamps. This is done by adding entries into the schedule where timestamps are "missing", while maintaining timestamp order, with free nodes=the free nodes in the following entry. Note that at the end of this step $fn_{pi,i} = fn_{pi,j}$ for all values of i and j $\epsilon$ [0,$sn_{pi}$-1]. For example, assume two sub-pools with free node schedules before normalization as follows (for purposes of the example, assume that ti<tj if i<j).

TABLE 1

| Sub-pool 1 | | Sub-pool 2 | |
| --- | --- | --- | --- |
| Free nodes | Timestamp | Free nodes | Timestamp |
| 5 | $t_0$ | 6 | $t_1$ |
| 7 | $t_2$ | 18 | $t_3$ |
| 13 | $t_3$ | 25 | INFINITE |
| 50 | INFINITE | | |

After normalization, the free node schedules would be:

TABLE 2

| Sub-pool 1 | | Sub-pool 2 | |
| --- | --- | --- | --- |
| Free nodes | Timestamp | Free nodes | Timestamp |
| 5 | $t_0$ | 6 | $t_0$ |
| 7 | $t_1$ | 6 | $t_1$ |
| 7 | $t_2$ | 18 | $t_2$ |

TABLE 2-continued

| Sub-pool 1 | | Sub-pool 2 | |
| --- | --- | --- | --- |
| Free nodes | Timestamp | Free nodes | Timestamp |
| 13 | $t_3$ | 18 | $t_3$ |
| 50 | INFINITE | 25 | INFINITE |

Figure 8:
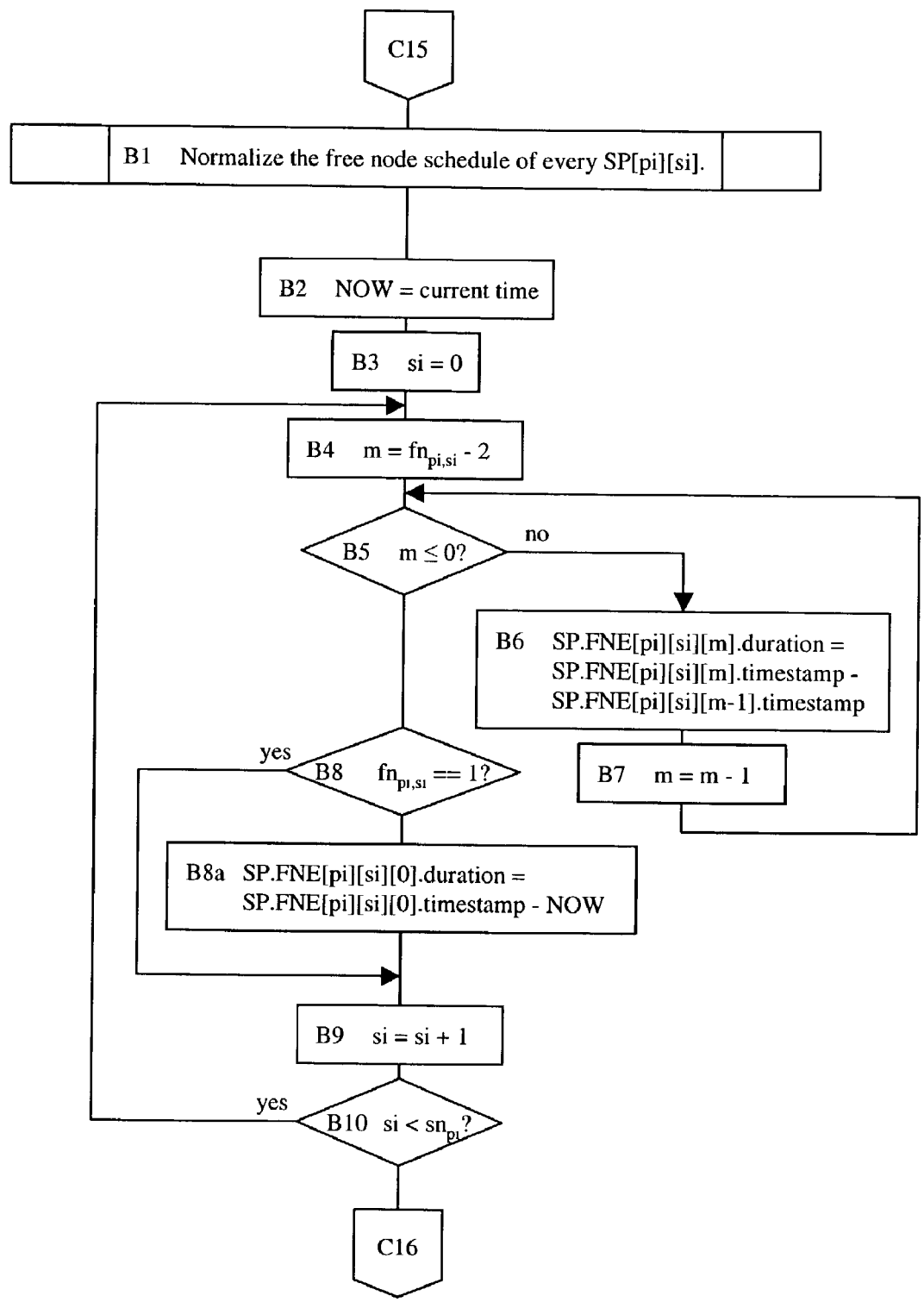
FIG. 8 is a flow diagram continued from FIG. 6 at block C15, and particularly illustrating steps for normalizing the free node schedules of every sub-pool in every pool and converting timestamps to time duration values.

Additionally, all the timestamps of the sub-pools are converted to time durations in blocks B2–B10 of FIG. 8. First the current time is determined and denoted as NOW. Then, depending on the number of entries in each sub-pool, the method either takes the difference between timestamps of adjacent entries, or sets the duration to the value of the timestamp if it is the first entry. In this manner, every timestamp value of every entry is substituted with a time duration value for a corresponding time slot.

Figure 9:
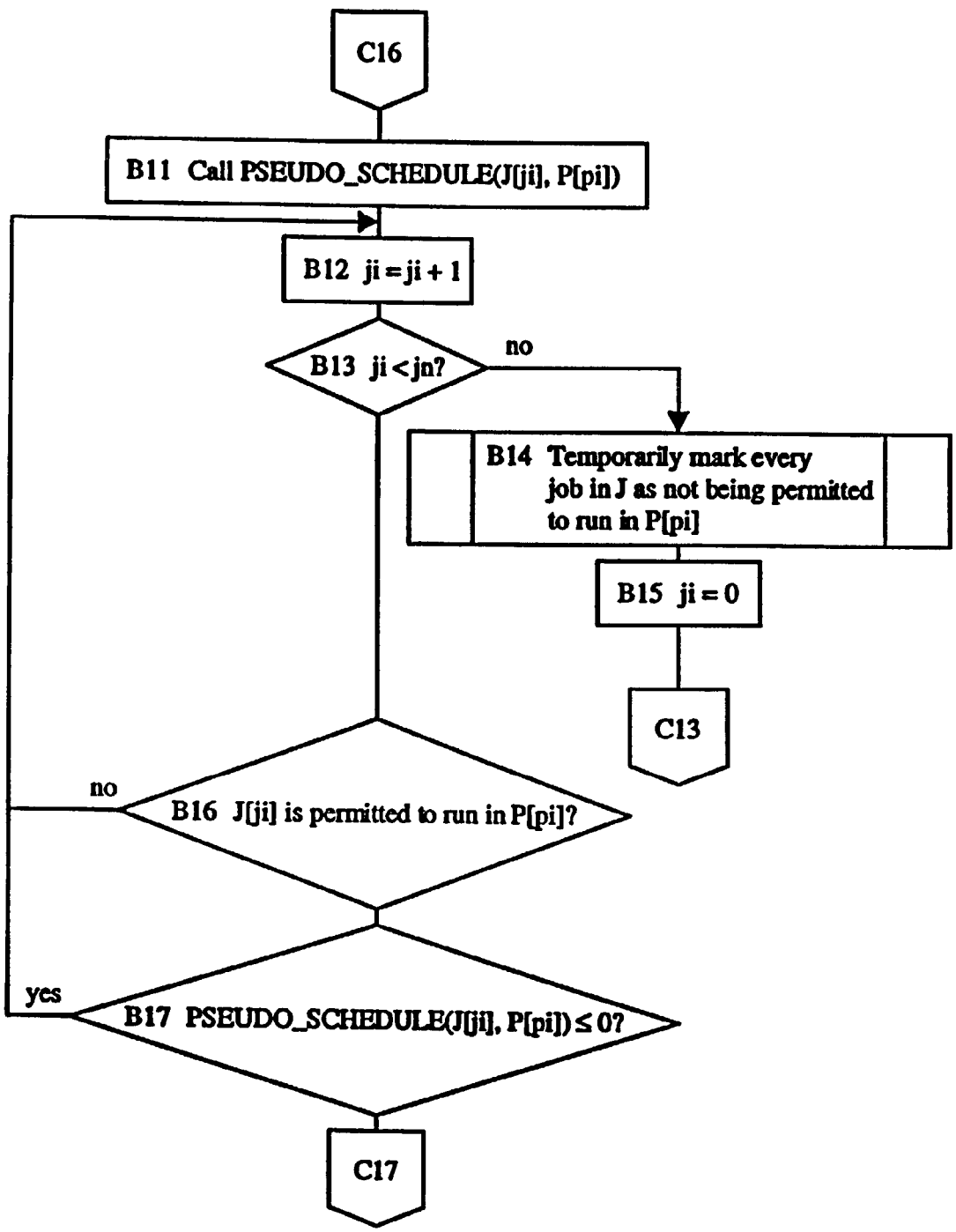
FIG. 9 is a flow diagram continued from FIG. 8 at block C16, and particularly illustrating steps for examining each job received for possible scheduling.

Once all the free node schedules have been normalized and converted to durational time values, the method proceeds to call a pseudo-schedule algorithm at block B11 in FIG. 9, to pseudo-schedule a job at a future time. The pseudo-scheduling subroutine, starting at step S1 in FIG. 11, operates to generally determine an "earliest available time range," defined as that time range for which there are sufficient resources available to run a job, including a sufficient duration and a sufficient number of free nodes to complete the job. Thus determination of the earliest available time range requires two parts: (1) finding sufficient free node schedule entries to cover job execution time, and (2) finding available free nodes for the job across all the sub-pools of the conforming sub-pool set. Generally, the pseudo-scheduling subroutine returns −1 if there are insufficient nodes to schedule the input job. It returns 1 if there are sufficient nodes to presently schedule the job for immediate execution. Otherwise, it returns 0 and additional steps are taken to mark the nodes required by the job as being dedicated to the job at the earliest possible time, i.e. the earliest available time range.

Figure 11:
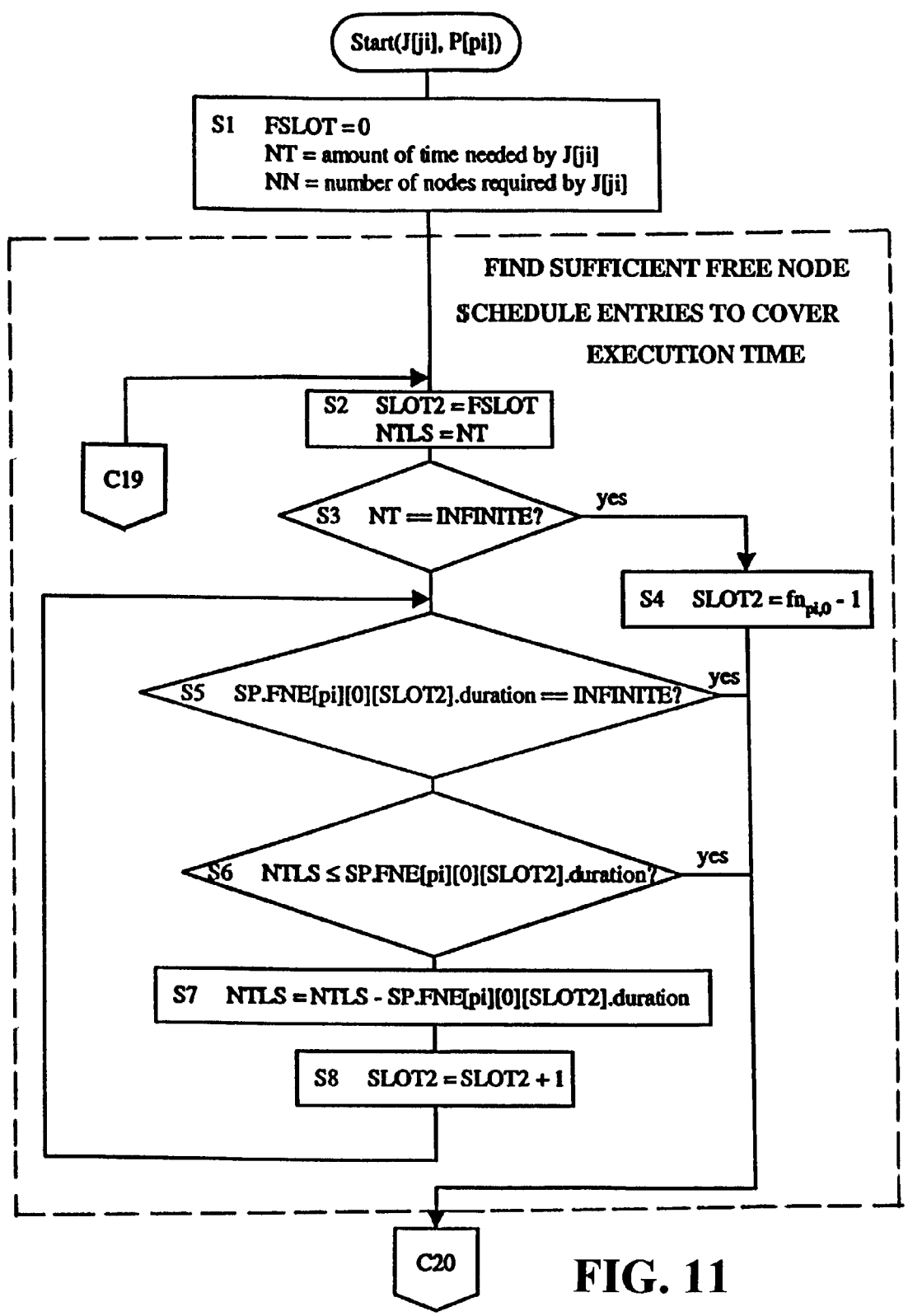
FIG. 11 is a flow diagram of a pseudo-scheduling subroutine called by blocks B11 and B17 in FIG. 9.

In first determining a sufficient number of free node schedule entries to cover job execution time, a variable FSLOT is initialized and set to 0 at step S1 in FIG. 11. (This is the assumption that the job would run now if scheduled.) In addition, the time needed by the job, NT, and the number of nodes needed by the job, NN, are set. The variable NTLS is defined as the needed time in the last slot. Steps S2 through S8, given FSLOT, a starting index, compute SLOT2 defined as the smallest index greater than or equal to FSLOT, such that the sum of duration values in entries FSLOT through SLOT2 equals or exceeds the expected execution time of the job. In addition to computing SLOT2, these steps compute the amount of time of the free node schedule entry with index SLOT2 (NTLS) would be consumed by the job if it was scheduled. The value NTLS is needed in step S24. When SLOT2 and NTLS are determined, the algorithm continues at step s9. In steps S1–S24, the earliest available time range is a span of time slots in free node schedule entries that "covers" the expected execution time of a job. This time span is the set of entries between entries with index FSLOT (in FIG. 11) through entries with index SLOT2 (see FIG. 11) inclusively. It is notable that the earliest available time range covers at least one time slot of a corresponding entry.

Figure 12:
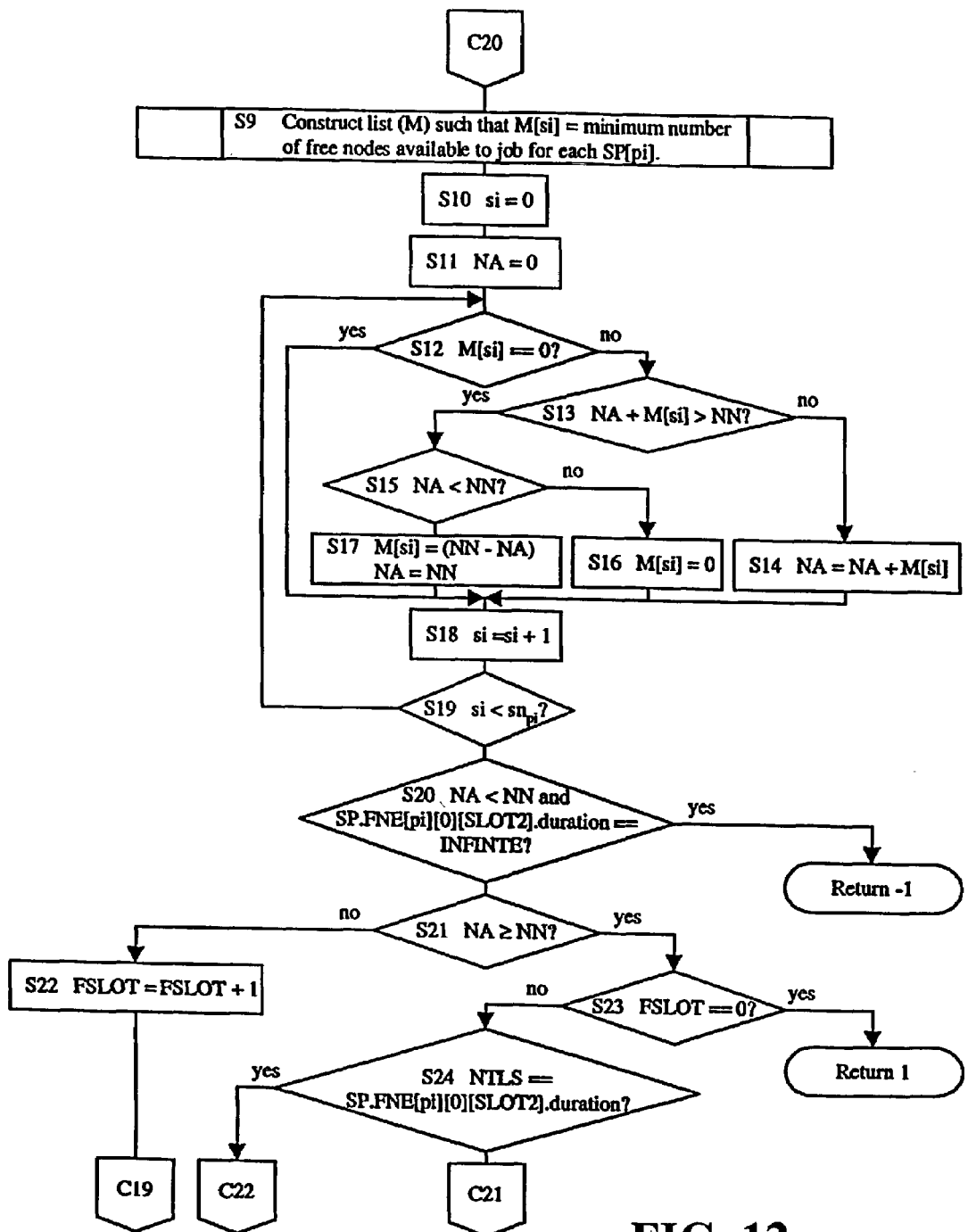
FIG. 12 is a flow diagram of the pseudo-scheduling subroutine continued from FIG. 11 at block C20, and particularly illustrating steps for finding available free nodes for a job.

Next, at steps S9 through S24 in FIG. 12, the method finds all available free nodes for a job across all the sub-pools of the conforming sub-pool set. In particular, step S9 calls for the creation of an array of free nodes denoted M. There must be as many entries in this array as there are sub-pools in the pool in which the job is to run. Each entry in M will contain the smallest number of free nodes available in entries FSLOT through SLOT2 in the corresponding sub-pool's free node schedule. Steps S10 through S19 calculate which sub-pools, starting with sub-pool index 0 would be allocated to the job and the number of free nodes in each until it finds sufficient free nodes for the job. As it calculates, it transforms the values in M from the number of free nodes in the sub-pool into the number of nodes from the sub-pool that would be allocated to the job if it was scheduled (steps S14, S16 and S17). As it examines each sub-pool, it determines if there are insufficient or sufficient free nodes to permit the job to run (step S13). If M[si] contains insufficient nodes, then the number of nodes that would be allocated to the job from the sub-pool is equal to the free nodes in that sub-pool, so the value of M[si] is not altered, but the number of nodes available is incremented by the free nodes in the sub-pool (step S14). But if the sub-pool contains sufficient free nodes, then if the number of nodes computed to be available so far is greater than or equal to the number of nodes needed (step S15), then no nodes from the sub-pool would be allocated to the job. This fact is indicated by setting the value of M[si] for that sub-pool to 0 (step S16). Otherwise, the sub-pool is the first sub-pool with sufficient free nodes to accommodate the job. Since it may be the case that not all the free nodes of this sub-pool are required, the actual required value is computed (NN-NA). In step S17, this value is stored in M[si] for the sub-pool and the number of nodes available is set to NN so that later iterations will cause the M[si] for those entries to be set to 0 (i.e., they will not donate free nodes to the job). Essentially, as many conforming free nodes as required by the job are marked for dedication to the job in the earliest available time range, in order of increasing node capacity starting with the conforming free nodes of a lowest order conforming sub-pool, i.e. the sub-pool having the lowest capacity usable by the job.

If, at step S20, the number of nodes available for the job is less than the number needed, and SLOT2 is the index of the last entry in the schedule, then there will never be sufficient nodes for the job. In this case, −1 is returned. If, at step S21, the number of nodes available for the job is less than the number needed, then there are insufficient nodes to run the job in the already calculated span of free nodes. So, FSLOT is incremented by one (step S22) and the algorithm continues at step S2 in an attempt to pseudo-schedule the job at a later time. Step S23 is reached if there are sufficient nodes found in entries FSLOT through SLOT2 to run the job. If FSLOT is 0, then the job would, in fact, run immediately if scheduled. In that case, 1 is returned. If, at step S24, the NTLS (needed time in the last slot) is equal to the duration of the free node schedule entry with index SLOT2, then no new free node schedule entry is needed and the algorithm continues at step S36. In this case, as many conforming free nodes are immediately allocated to the job as required by the job, in order of increasing node capacity starting with the conforming free nodes of a lowest order conforming sub-pool.

Figure 13:
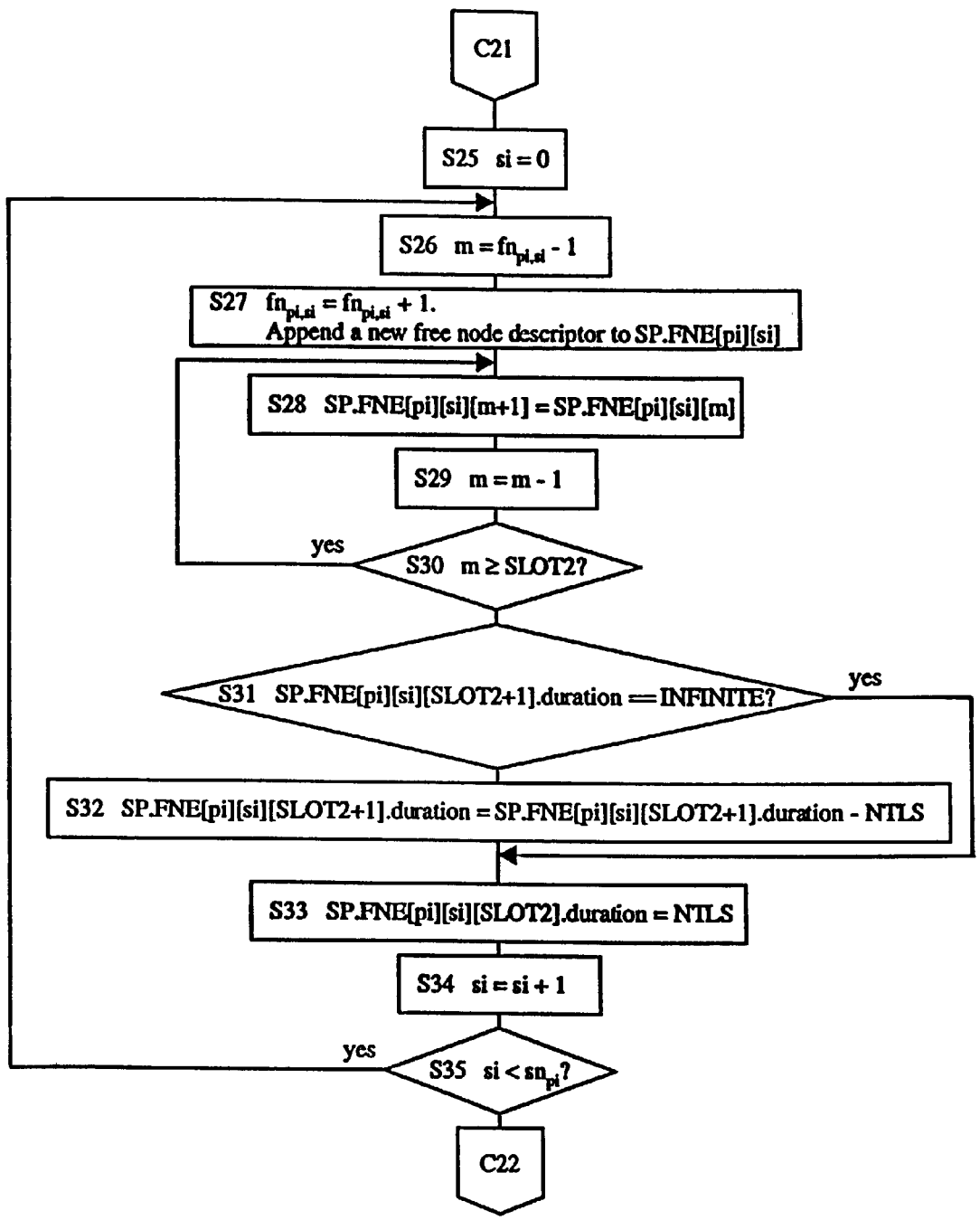
FIG. 13 is a flow diagram of the pseudo-scheduling subroutine continued from FIG. 12 at block C21, and particularly illustrating steps for inserting free node schedule entries for a job.

And in FIG. 13, steps S25 through S35 make "room" for a new free node schedule entry in all the sub-pools of the pool in which the job is to run. In step S26, a secondary variable, m, is set to the index of the last free node schedule entry in the sub-pool. Step S27 increments by one the number of entries in the free node schedule. Steps S28 through S30 iterate to move the free node schedule entries "down" one to make room for the new entry. The iteration ends when all entries after SLOT2 are moved. If at step S31, it is found that SLOT2 indexes the (previous) last entry, then the duration of the (new) last entry is not changed. Otherwise, in step S32, the duration of the entry after SLOT2 is reduced by the NTLS computed around step S7. In step S33, the duration of the new entry is set to NTLS. Steps S34 and S35 assure that steps S26 through S33 are done for each sub-pool. And in FIG. 14, steps S36 through S42 decrements, for each sub-pool, the free nodes available in entries with index in the range FSLOT through SLOT2 by the number of nodes that would be allocated to the job in that sub-pool if scheduled. These values are contained in the array named M described in steps S9 through S17.

In the manner and process of determining the earliest available time range discussed above, a job may be determined to be capable of being backfill scheduled ahead of a higher priority job. As defined earlier, "backfill scheduling" is the scheduling using dedicated node scheduling of a job with lower priority ahead of a higher priority job in such a way that the anticipated initiation time of the higher priority job is not delayed. It is appreciated that backfill scheduling will occur upon a determination that a start time of the earliest available time range of a lower priority job to be scheduled occurs prior to a future start time of the earliest available time range of at least one of a set of higher priority jobs previously pseudo-scheduled for future execution, the step of scheduling the lower priority job is defined as backfill scheduling the lower priority job for execution starting ahead of the future start time of the at least one higher priority job. The manner of determining the earliest available time range for scheduling the job ensures that any backfill or non-backfill scheduling will not delay the anticipated start times of any previously pseudo-scheduled higher priority job. Furthermore, if, upon backfill scheduling a lower priority job ahead of one of more higher priority pseudo-scheduled jobs, it is determined that the earliest available time range starts with the first entry, i.e. immediately executable, the lower priority job would then be presently scheduled for immediate execution with the corresponding allocation of nodes and resources. Alternatively, if, upon backfill scheduling a lower priority job, it is determined that the earliest available time range starts at a later non-first entry, then the lower priority job is pseudo-scheduled to begin execution at the future start time of the earliest available time range, with nodes being marked as being dedicated to the job.

Figure 10:
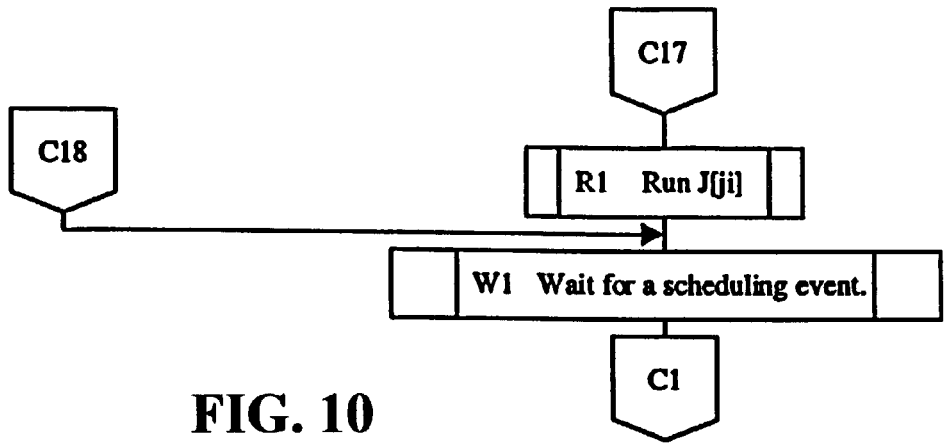
FIG. 10 is a flow diagram continued from FIG. 9 at block C17, and particularly illustrating steps for presently scheduling a job for immediate execution.
Figure 14:
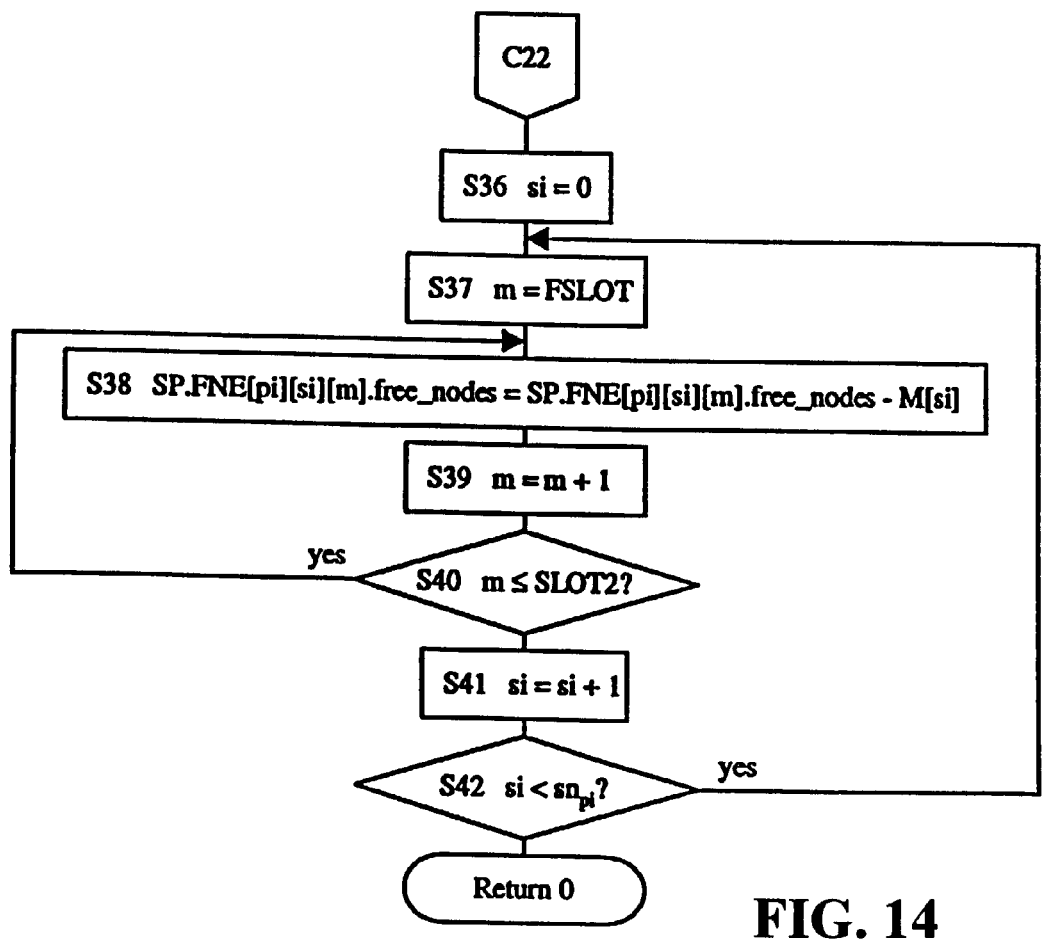
FIG. 14 is a flow diagram of the pseudo-scheduling subroutine continued from FIG. 12 at block C22 or FIG. 13 at block C22, and particularly illustrating steps for allocating available free nodes to a job.

Once all the jobs have been scheduled, either by present scheduling for immediate execution, or pseudo-scheduling for execution at a future time, the process returns block W1 in FIG. 10 to wait for a scheduling event. A scheduling event may be, for example: a job termination, a job submission, any event that makes a previously submitted job eligible to run, any event that causes the expected termination time of any running job to change, or any event that causes the expected run time of any submitted job to change. In such event, the scheduling process is re-initialized by preferably returning to step I3.

While particular operational sequences, parameters, and particular embodiments have been described and or illustrated, such are not intended to be limiting. Modifications and changes may become apparent to those skilled in the art, and it is intended that the invention be limited only by the scope of the appended claims.

We claim:

1. A method for job scheduling in a dedicated heterogeneous multi-node computing environment, the method comprising:

grouping the nodes into homogeneous node sub-pools each comprising nodes of equal capacity;
for each sub-pool, creating a corresponding free node schedule which charts a number of free nodes in the sub-pool over time;
receiving a plurality of jobs to be scheduled;
ordering the jobs by job priority;
for each job in order of job priority,
  (a) identifying a conforming sub-pool set comprising conforming nodes of sufficient capacity suitable for use by the job,
  (b) determining an earliest available time range from the free node schedule(s) of the conforming sub-pool set, where the earliest available time range has a sufficient duration and a sufficient number of conforming free nodes to complete the job, and
  (c) scheduling the job for execution in the earliest available time range; and
executing the jobs at their respective earliest available time ranges.

2. The method as in claim 1,
wherein, upon a determination that the earliest available time range of the job starts at a present time, the step of scheduling the job comprises presently scheduling the job for immediate execution by allocating as many conforming free nodes to the job as required thereby in order of increasing node capacity starting with the conforming free nodes of a lowest order conforming sub-pool.

3. The method as in claim 1,
wherein, upon a determination that the earliest available time range of the job starts at a future time, the step of scheduling the job comprises pseudo-scheduling the job for future execution by marking for dedication to the job as many conforming free nodes in the earliest available time range as required by the job, in order of increasing node capacity starting with the conforming free nodes of a lowest order conforming sub-pool.

4. The method as in claim 3,
wherein, upon a determination that a start time of the earliest available time range of a lower priority job to be scheduled occurs prior to a future start time of the earliest available time range of at least one of a set of higher priority jobs previously pseudo-scheduled for future execution, the step of scheduling the lower priority job comprises backfill scheduling the lower priority job for execution starting ahead of the future start time of the at least one higher priority job, whereby anticipated future start times of the previously pseudo-scheduled set of higher priority jobs are not delayed by the backfill scheduling.

5. The method as in claim 1,
wherein each job received to be scheduled includes a set of job specifications provided by a user for executing the job, including minimum node capacity, expected job execution time, and number of nodes needed.

6. The method as in claim 1,
further comprising discovering the nodes to be grouped in the dedicated heterogeneous multi-node computing environment including discovering capacities of the discovered nodes.

7. The method as in claim 1,
further comprising grouping the sub-pools into pools for partitioning the computing environment.

8. A method for job scheduling in a dedicated heterogeneous multi-node computing environment, the method comprising:
grouping the nodes into homogeneous node sub-pools each comprising nodes of equal capacity;
for each sub-pool, creating a corresponding free node schedule which charts the number of free nodes in the sub-pool over time, each free node schedule comprising at least one entry having a timestamp value specifying an end time of a corresponding time slot, and a scalar value specifying the number of free nodes in the corresponding sub-pool during the time slot;
receiving a plurality of jobs to be scheduled;
ordering the jobs by job priority;
for each job in order of job priority,
  (a) identifying a conforming sub-pool set comprising conforming nodes of sufficient capacity suitable for use by the job,
  (b) determining an earliest available time range from the free node schedule(s) of the conforming sub-pool set, where the earliest available time range has a sufficient duration and a sufficient number of conforming free nodes to complete the job, and
  (c) scheduling the job for execution in the earliest available time range; and
executing the jobs at their respective earliest available time ranges.

9. The method as in claim 8,
wherein each free node schedule includes an initialization entry having an infinite timestamp value, and a maximum scalar value specifying a total number of nodes in the corresponding sub-pool.

10. The method as in claim 9,
wherein each free node schedule further includes at least one additional entry, where the entries are arranged in order of increasing timestamp value with the initialization entry designated as a last entry.

11. The method as in claim 10,
wherein the step of creating each free node schedule includes normalizing the free node schedules of the sub-pools so that every free node schedule has the same number of entries, and same rank entries have identical timestamp values.

12. The method as in claim 11,
wherein the step of creating each free node schedule further includes converting the timestamp value of each entry to a time duration value of the time slot.

13. The method as in claim 8,
wherein the earliest available time range is determined by further determining a least number of entries to cover an expected execution time of the job.

14. The method as in claim 8,
wherein, upon determining that the earliest available time range includes the time slot of a first entry of any of the free node schedule(s) of the conforming sub-pool set, the step of scheduling the job comprises presently scheduling the job for immediate execution by allocating as many conforming free nodes to the job as required thereby in order of increasing node capacity starting with the conforming free nodes of a lowest order conforming sub-pool.

15. The method as in claim 8,
wherein, upon determining that the earliest available time range does not include the time slot of a first entry of any of the free node schedule(s) of the conforming sub-pool set, the step of scheduling the job comprises pseudo-scheduling the job for future execution by marking for dedication to the job as many conforming free nodes in the earliest available time range as required by the job, in order of increasing node capacity starting with the conforming free nodes of a lowest order conforming sub-pool.

16. The method as in claim 15, wherein, upon determining that a start time of the earliest available time range of a lower priority job to be scheduled occurs prior to a future start time of the earliest available time range of at least one of a set of higher priority jobs previously pseudo-scheduled for future execution, the step of scheduling the lower priority job comprises backfill scheduling the lower priority job for execution starting ahead of the future start time of the at least one higher priority job, whereby anticipated future start times of the previously pseudo-scheduled set of higher priority jobs are not delayed by the backfill scheduling.

17. A method for job scheduling in a dedicated heterogeneous multi-node computing environment, the method comprising:

grouping the nodes into homogeneous node sub-pools each comprising nodes of equal capacity;

for each sub-pool, creating a corresponding free node schedule which charts a number of free nodes in the sub-pool over time;

receiving a plurality of jobs to be scheduled;

ordering the jobs by job priority;

for each job in order of job priority,
  (a) identifying a conforming sub-pool set comprising conforming nodes of sufficient capacity suitable for use by the job,
  (b) determining an earliest available time range from the free node schedule(s) of the conforming sub-pool set, where the earliest available time range has a sufficient duration and a sufficient number of conforming free nodes to complete the job, and
  (c) scheduling the job for execution in the earliest available time range, including, (1) upon a determination that the earliest available time range of the job starts at a present time, presently scheduling the job for immediate execution by allocating as many conforming free nodes to the job as required thereby in order of increasing node capacity starting with the conforming free nodes of a lowest order conforming sub-pool, (2) upon a determination that the earliest available time range of the job starts at a future time, pseudo-scheduling the job for future execution by marking for dedication to the job as many conforming free nodes in the earliest available time range as required by the job, in order of increasing node capacity starting with the conforming free nodes of a lowest order conforming sub-pool, and (3) upon a determination that a start time of an earliest available time range of a lower priority job to be scheduled occurs prior to a future start time of an earliest available time range of at least one of a set of higher priority jobs previously pseudo-scheduled for future execution, backfill scheduling the lower priority job for execution starting ahead of the future start time of the at least one of the set of higher priority jobs, whereby anticipated future start times of the previously pseudo-scheduled set of higher priority jobs are not delayed by the backfill scheduling; and executing the jobs at their respective earliest available time ranges.

18. A computer system for job scheduling in a dedicated heterogeneous node computer environment, the computer system comprising:

a data mining component that discovers the nodes and node capacities in the scheduling environment;

a node grouping component that groups the discovered nodes into homogeneous node sub-pools each comprising nodes of equal capacity;

a free node schedule forming component that creates for each sub-pool a corresponding free node schedule which charts a number of free nodes in the corresponding sub-pool over time;

a user interface for receiving a plurality of jobs to be scheduled;

an ordering component for ordering the jobs by job priority;

a job analyzing component that, for each job in order of job priority,
  (a) identifies a conforming sub-pool set comprising conforming nodes of sufficient capacity suitable for use by the job, and
  (b) determines an earliest available time range from the free node schedule(s) of the conforming sub-pool set, where the earliest available time range has a sufficient duration and a sufficient number of conforming free nodes to complete the job; and a job scheduling component for scheduling each job for execution in the respective earliest available time range.

19. A computer-readable medium containing instructions for controlling a computer system to schedule jobs in a dedicated heterogeneous multi-node computing environment, by:

grouping the nodes into homogeneous node sub-pools each comprising nodes of equal capacity;

for each sub-pool, creating a corresponding free node schedule which charts a number of free nodes in the sub-pool over time;

receiving a plurality of jobs to be scheduled;

ordering the jobs by job priority;

for each job in order of job priority,
  (a) identifying a conforming sub-pool set comprising conforming nodes of sufficient capacity suitable for use by the job,
  (b) determining an earliest available time range from the free node schedule(s) of the conforming sub-pool set, where the earliest available time range has a sufficient duration and a sufficient number of conforming free nodes to complete the job, and
  (c) scheduling the job for execution in the earliest available time range; and executing the jobs at their respective earliest available time ranges.

20. A computer-readable medium containing instructions for controlling a computer system to schedule jobs in a dedicated heterogeneous multi-node computing environment, by:

grouping the nodes into homogeneous node sub-pools each comprising nodes of equal capacity;

for each sub-pool, creating a corresponding free node schedule which charts a number of free nodes in the sub-pool over time;

receiving a plurality of jobs to be scheduled;

ordering the jobs by job priority;

for each job in order of job priority,
  (a) identifying a conforming sub-pool set comprising conforming nodes of sufficient capacity suitable for use by the job,
  (b) determining an earliest available time range from the free node schedule(s) of the conforming sub-pool set, where the earliest available time range has a sufficient duration and a sufficient number of conforming free nodes to complete the job, and (c) scheduling the job for execution in the earliest available time range, including, (1) upon a determination that the earliest available time range of the job starts at a present time, presently scheduling the job for immediate execution by allocating as many conforming free nodes to the job as required thereby in order of increasing node capacity starting with the conforming free nodes of a lowest order conforming sub-pool, (2) upon a determination that the earliest available time range of the job starts at a future time, pseudo-scheduling the job for future execution by marking for dedication to the job as many conforming free nodes in the earliest available time range as required by the job, in order of increasing node capacity starting with the conforming free nodes of a lowest order conforming sub-pool, and (3) upon a determination that a start time of an earliest available time range of a lower priority job to be scheduled occurs prior to a future start time of an earliest available time range of at least one of a set of higher priority jobs previously pseudo-scheduled for future execution, backfill scheduling the lower priority job for execution starting ahead of the future start time of the at least one of the set of higher priority jobs, whereby anticipated future start times of the previously pseudo-scheduled set of higher priority jobs are not delayed by the backfill scheduling; and executing the jobs at their respective earliest available time ranges.

* * * * *